(No Model.) 2 Sheets—Sheet 1.
F., R. & O. KAMPFE.
SAFETY RAZOR.
No. 554,823. Patented Feb. 18, 1896.
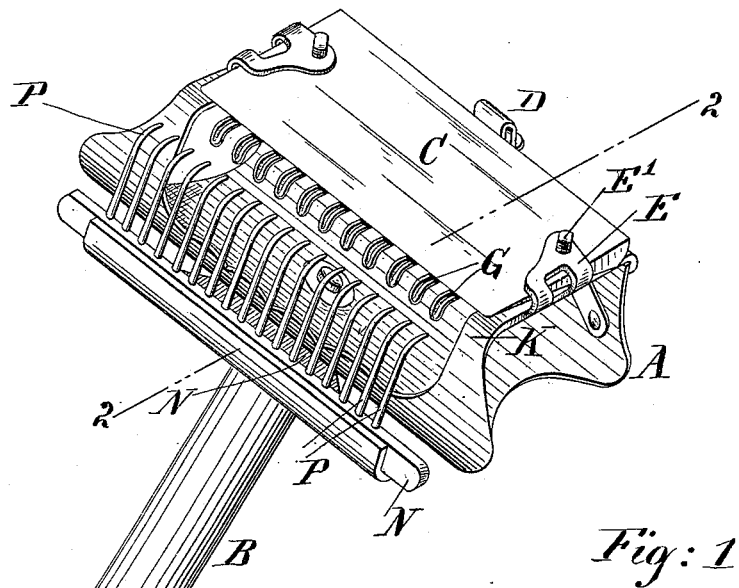
Fig: 1.
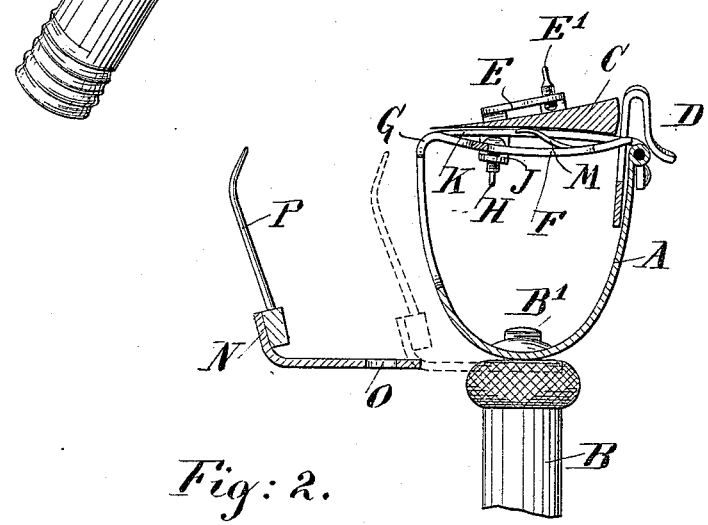
Fig: 2.
Witnesses
S. Petri-Palmedo
Gustav Otto
F. Kampfe
R. Kampfe
O. Kampfe
Inventors
By their Attorney
Oscar Gunz

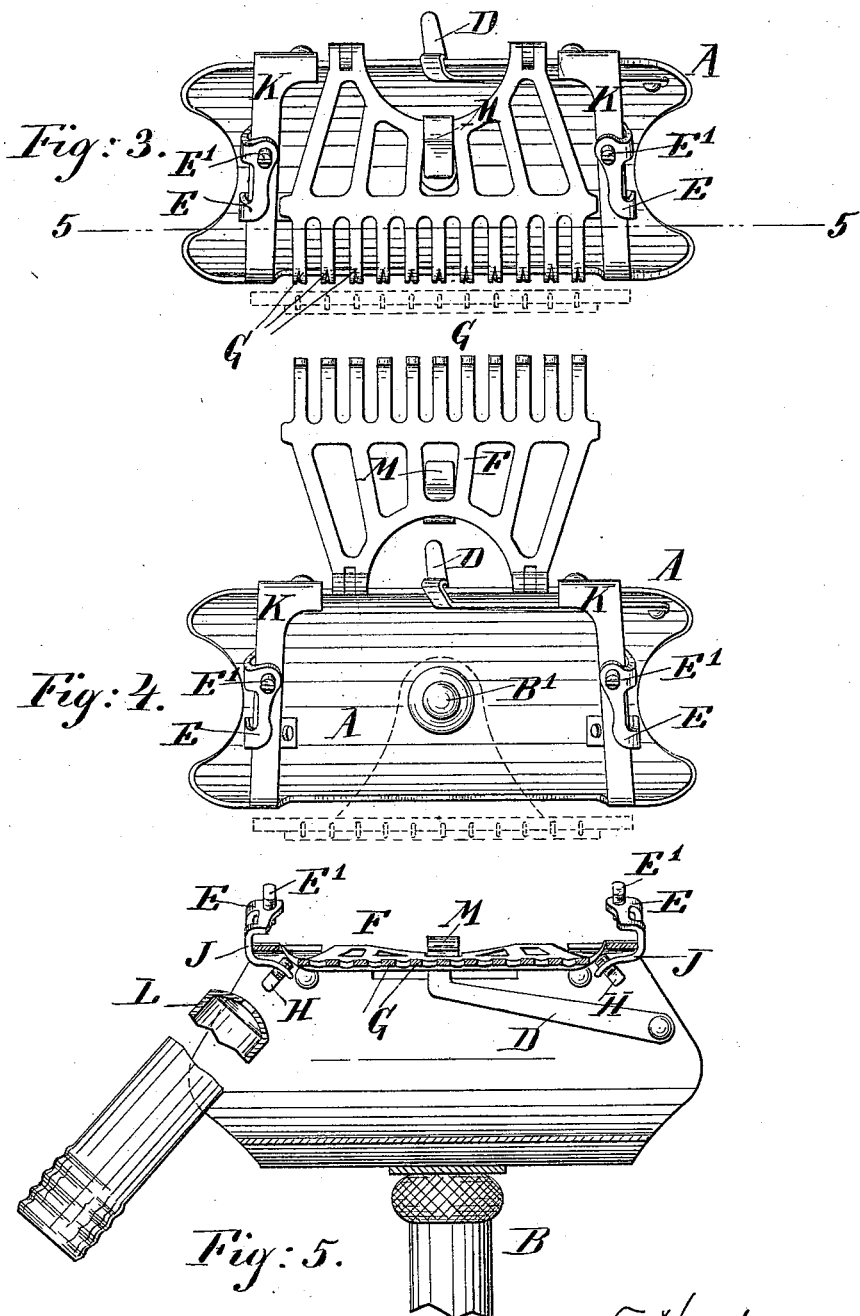

UNITED STATES PATENT OFFICE.

FREDERICK KAMPFE, RICHARD KAMPFE, AND OTTO KAMPFE, OF BROOKLYN, NEW YORK.

SAFETY-RAZOR.

SPECIFICATION forming part of Letters Patent No. 554,823, dated February 18, 1896.

Application filed October 2, 1895. Serial No. 564,418. (No model.)

*To all whom it may concern:*

Be it known that we, FREDERICK KAMPFE, RICHARD KAMPFE, and OTTO KAMPFE, citizens of the United States, and residents of Brooklyn, in the county of Kings and State of New York, have invented certain new and useful Improvements in Safety-Razors, of which the following is a specification.

This invention relates to improvements in safety-razors.

The object of our invention is to provide a new and improved safety-razor which is so constructed that the lather can easily be removed and the razor thoroughly cleaned with great facility, and a further object of our invention is to provide a skin-stretching attachment which can readily be applied for stretching the skin in advance of the cutting-edge of the blade.

The invention consists in a safety-razor having its blade-holding casing or frame constructed with a hinged top provided at its front edge with a guard.

The invention further consists in the combination, with said casing, of a detachable skin-stretcher which can be held on the casing in advance of the front of the same.

The invention also consists in the construction and combination of parts and details, as will be fully described hereinafter, and finally pointed out in the claims.

In the accompanying drawings, forming a part of this specification, and in which like letters of reference indicate like parts in all the views, Figure 1 is a perspective view of our improved safety-razor provided with the skin-stretcher. Fig. 2 is a vertical transverse sectional view of the same on the line 2 2 of Fig. 1, the skin-stretcher being detached. Fig. 3 is a plan view of the same, the skin-stretcher being shown in dotted lines. Fig. 4 is a plan view of the same, the swinging top being swung back and the skin-stretcher shown in dotted lines. Fig. 5 is a vertical longitudinal sectional view on the line 5 5 of Fig. 3.

The shell frame or casing A for holding the blade C is made approximately U-shaped in cross-section, preferably of sheet metal, and is provided at its top with a cross-piece K at each end, which cross-pieces connect the front and rear walls of said casing. A handle B is provided at its upper end with a threaded neck B', which can be screwed into a threaded aperture in the bottom of the casing. Each cross-piece K is provided on its outer edge with an angle-lug E, each containing an adjusting-screw E' for adjusting the blade to project a greater or less distance beyond the front edge of the top of the casing. The angle-lugs E are bent over the upper surfaces of the cross-pieces K and toward each other, and the blade is confined between said angle-lugs and the cross-pieces K.

A spring-latch D, pivoted on the back of casing A, bears against the rear edge of the blade C and presses same forward and against the inner ends of the screws E'.

A top F, provided with slots and having at its front edge bent prongs G, forming a guard-comb, is hinged to the top edge of the rear wall of the casing A, and is adapted to rest at its sides and near the front edge on two screws H, screwed through lugs J, formed on the outer edges of the cross-pieces K and bent under said cross-pieces, as shown. A spring-finger M is made integral with said hinged top and is bent over the upper surface of said top, so as to press against the under side of the blade to assist in holding the same securely in place.

The screws E' and H can easily be adjusted by means of handle extension-piece L, which is provided with its closed end with a squared aperture for receiving the squared heads of said screws.

When the blade C is held in place on the casing A, the cutting-edge projects a greater or less distance beyond the curved ends of the guard teeth or prongs G, which prevent the edge from cutting into the skin.

After the razor has been used and the blade removed the hinged top can be swung up and easily wiped clean, thus facilitating the cleaning of the casing.

The skin-stretcher consists of an angle-plate N, having an aperture O, through which the threaded neck B' of the handle B can be passed for the purpose of holding said angle-plate on the under side of the casing A, as shown in Fig. 1 in full lines and in Fig. 2 in dotted lines.

To the upturned front edge of the angle-plate N a series of upwardly-inclined prongs P are fastened, the upper ends of which are a short distance from the ends of the guard-teeth G, when the plate N is held on the underside of the casing, and thus serve to stretch the skin in advance of the cutting-edge of the blade.

In case the skin-stretcher is not required it can easily be detached and the razor used without the same.

Having thus described our invention, what we claim as new, and desire to secure by Letters Patent, is—

1. In a safety-razor, the combination with a blade-holding casing, having two end cross-pieces on its top, of a hinged top between said cross-pieces, which hinged top rests loosely and entirely disconnected upon lugs of the side pieces, to adapt it to be swung up for removing the lather and which hinged top has a guard at its free edge, substantially as herein shown and described.

2. In a safety-razor, the combination with a blade-holding casing, having a cross-piece at each end of its top, each cross-piece being provided with a downwardly-bent lug, an adjustable stop in each lug, a top hinged to said casing between the end cross-pieces to rest loosely on said adjustable stops and in such a manner that it can be readily lifted, said hinged top being provided with a guard at its front edge, substantially as herein shown and described.

In testimony that we claim the foregoing as our invention we have signed our names, in presence of two witnesses, this 17th day of September, 1895.

FREDERICK KAMPFE.
RICHARD KAMPFE.
OTTO KAMPFE.

Witnesses:
H. ADOLPH WINKOPP,
LOUIS BOHNER.